No. 839,701. PATENTED DEC. 25, 1906.
H. A. ARVIG.
CREAMING CAN.
APPLICATION FILED NOV. 8, 1906.

Witnesses
Edwin L. Jewell
C. D. Davis

Inventor
Hans A. Arvig
By R. H. Bishop
Attorney

UNITED STATES PATENT OFFICE.

HANS A. ARVIG, OF PINE RIVER, MINNESOTA.

CREAMING-CAN.

No. 839,701.  Specification of Letters Patent.  Patented Dec. 25, 1906.

Application filed November 8, 1906. Serial No. 342,518.

*To all whom it may concern:*

Be it known that I, HANS A. ARVIG, a citizen of the United States of America, residing at Pine River, in the county of Cass and State of Minnesota, have invented certain new and useful Improvements in Creaming-Cans, of which the following is such a full, clear, and exact description as will enable others skilled in the art to which it appertains to make and use the same.

This invention relates to improvements in creaming-cans of the type shown in Letters Patent No. 827,495, granted to me July 31, 1906; and it consists in certain novel features hereinafter first fully described and then particularly pointed out in the claims.

Figure 1:
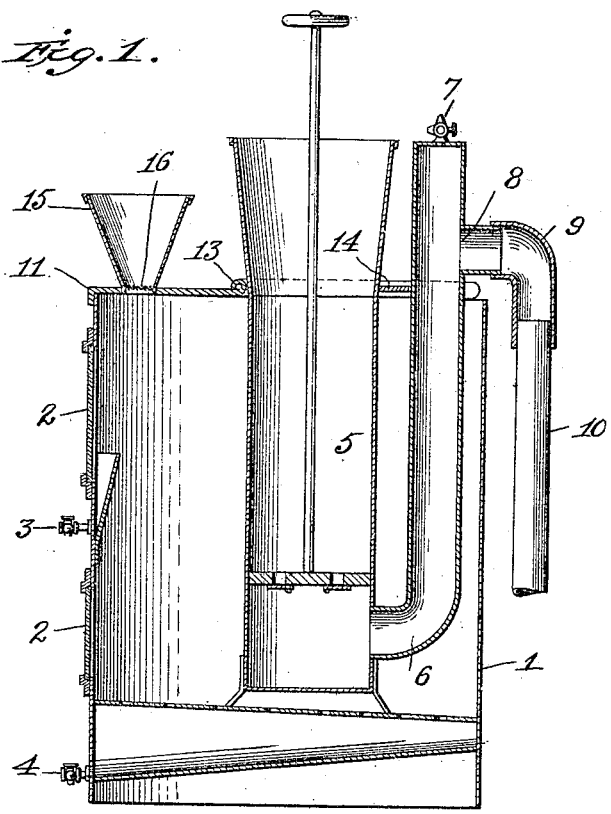
Figure 2:
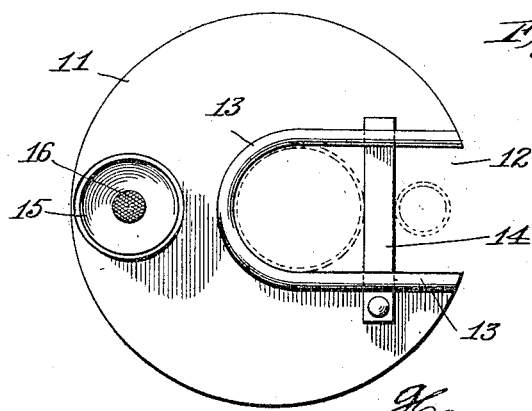

In the drawings, Figure 1 is a vertical section of a creaming-can embodying the present invention, and Fig. 2 is a plan view of the cover.

The can-body 1 is provided with the sight-glasses 2, through which the height of the milk and cream therein may be noted. Two of these glasses are provided in order that if the milk should not rise to the level of the cream-faucet 3 the milk-discharge faucet 4 at the bottom of the vessel may be used to draw off the entire contents, the faucet being closed after the milk is drawn to separate the same from the cream and then being again opened after a cream-receiving vessel has been substituted for the milk-receptacle. A water-cylinder 5 is arranged within the can or vessel, and from the lower end of this cylinder is extended a pipe 6, which passes up to the top of the vessel and has its upper end fitted with a cock or faucet 7, while it is provided with an opening 8 in its side just below said faucet. An elbow 9 leads laterally from said opening over the edge of the vessel into a downwardly-extending escape-pipe 10. A cover 11 is constructed to fit upon the upper end of the can or vessel and is provided with a notch or open-ended slot 12 to permit it to be engaged around the cylinder 5 and the pipe 6. A rim 13 is formed along the sides of the slot and a slide 14 is mounted in said rim and adapted to be pushed across the slot between the cylinder 5 and the pipe 6 to fasten the cover in position and to close the space between the cylinder and pipe to exclude dirt from the vessel. A funnel 15, having a screened bottom 16, is formed on the cover to provide means for admitting the milk and cream to the can and filtering the same as it is poured into the can.

The can being arranged as shown and described, the milk is poured through the funnel 15 and screen 16 and water fed into the water-cylinder, the cock 7 being open, so that a siphon through the pipes 6 and 10 will not be formed. The water will thus be held in the pipe 6 and the water-cylinder and the milk reduced in temperature, as will be readily understood. As the milk cools the cream will rise thereon and may be readily drawn off. Should it be desired to drain off the water so as to replenish the cylinder with cooler water, the cock 7 is closed, so that a siphon will be established and the water run off. The cover can be quickly placed on and removed from the can and will prevent the falling of insects or particles of dirt into the milk.

Having thus described my invention, what I claim, and desire to secure by Letters Patent, is—

1. The combination of the outer vessel, the water-cylinder therein, a pipe leading upward from the lower end of the water-cylinder and laterally over the edge of the outer vessel, a cover fitted over the outer vessel and having a slot to engage the said water-cylinder and the pipe leading therefrom, and a slide mounted on the cover in position to be projected across the slot between the said water-cylinder and pipe.

2. The combination of the outer vessel, the water-cylinder therein, the pipe leading upward from the lower end of the said cylinder, a cover fitted on the outer vessel and having a slot to engage the said water-cylinder and pipe, a slide mounted on the cover to be projected across the slot between the cylinder and pipe, and a funnel carried by the cover and having a screen-bottom.

In testimony whereof I have signed this specification in the presence of two subscribing witnesses.

HANS A. ARVIG.

Witnesses:
J. E. GENREY,
F. L. HILL.